US009614261B2

(12) United States Patent
Kepler et al.

(10) Patent No.: US 9,614,261 B2
(45) Date of Patent: Apr. 4, 2017

(54) PROCESS FOR RECYCLING ELECTRODE MATERIALS FROM LITHIUM-ION BATTERIES

(71) Applicant: FARASIS ENERGY, INC., Hayward, CA (US)

(72) Inventors: Keith D. Kepler, Belmont, CA (US); Floris Tsang, Walnut Creek, CA (US); Robbert Vermeulen, Pleasant Hill, CA (US); Phillip Hailey, Oakland, CA (US)

(73) Assignee: Farasis Energy, Inc., Hayward, CA (US)

( * ) Notice: Subject to any disclaimer, the term of this patent is extended or adjusted under 35 U.S.C. 154(b) by 0 days.

(21) Appl. No.: 14/826,170

(22) Filed: Aug. 13, 2015

(65) Prior Publication Data

US 2016/0072162 A1    Mar. 10, 2016

Related U.S. Application Data

(60) Provisional application No. 62/036,924, filed on Aug. 13, 2014.

(51) Int. Cl.
| | |
|---|---|
| B07C 5/02 | (2006.01) |
| H01M 10/54 | (2006.01) |
| B03B 5/30 | (2006.01) |
| B03B 5/44 | (2006.01) |
| H01M 10/052 | (2010.01) |
| H01M 6/52 | (2006.01) |

(52) U.S. Cl.
CPC .............. *H01M 10/54* (2013.01); *B03B 5/30* (2013.01); *B03B 5/442* (2013.01); *H01M 6/52* (2013.01); *H01M 10/052* (2013.01); *Y02E 60/122* (2013.01); *Y02W 30/84* (2015.05)

(58) Field of Classification Search
CPC ...... H01M 10/052; H01M 10/54; H01M 6/62; B03B 5/30; B03B 5/442
USPC .................................................. 209/3.1, 606
See application file for complete search history.

(56) References Cited

U.S. PATENT DOCUMENTS

| | | | |
|---|---|---|---|
| 8,404,138 B2* | 3/2013 | Arimura | H01M 10/052 216/83 |
| 8,616,475 B1* | 12/2013 | Smith | H01M 10/54 241/21 |
| 8,882,007 B1* | 11/2014 | Smith | H01M 10/54 241/21 |

(Continued)

*Primary Examiner* — Terrell Matthews
(74) *Attorney, Agent, or Firm* — Blakely, Sokoloff, Taylor & Zafman LLP

(57) ABSTRACT

Herein is disclosed a process for recycling electrode material from lithium-ion batteries, comprising harvesting a mixture of anode and cathode electrode materials from waste lithium-ion batteries, and separating the anode electrode material from the cathode electrode material by means of dense liquid separation. The mixed anode and cathode material is suspended in a liquid that has a density between those of the anode material and cathode material, such that the anode material rises to the top of the dense liquid and the cathode material sinks to the bottom of the dense liquid. The thus separated materials can easily be collected and further purified and regenerated for reuse in new lithium-ion batteries, providing an efficient and low-cost method for recycling electrode active materials from waste lithium-ion batteries.

19 Claims, 3 Drawing Sheets

(56) References Cited

U.S. PATENT DOCUMENTS

| | | | |
|---|---|---|---|
| 2009/0229413 A1* | 9/2009 | Kakuta | C25C 3/02 75/402 |
| 2013/0287621 A1* | 10/2013 | Fujita | C22B 7/007 420/435 |
| 2016/0072162 A1* | 3/2016 | Kepler | H01M 10/54 209/3.1 |

* cited by examiner

1

PROCESS FOR RECYCLING ELECTRODE MATERIALS FROM LITHIUM-ION BATTERIES

CROSS-REFERENCE TO RELATED APPLICATION

This application claims priority to U.S. Provisional Application No. 62/036,924, filed on Aug. 13, 2014, entitled "Method and Apparatus for Processing Recovered Li-ion Battery Materials", which is specifically and entirely incorporated by reference.

FIELD OF THE INVENTION

This invention is applicable to the field of lithium-ion batteries, specifically to a process for recycling electrode material from lithium-ion batteries by recovering electrode materials of these batteries so that they can be reused in new lithium-ion cells.

BACKGROUND OF THE INVENTION

Lithium-ion (Li-ion) batteries are being produced in ever increasing numbers, particularly as the size of Li-ion batteries increases and the market for EV's, Backup Power and Consumer electronics keep growing. There is a strong need to be able to recycle these batteries after their useful life in that application has expired. One approach that has been proposed is described as "direct" recycling, in which instead of melting the batteries down to recover only the valuable metals from the cells such as Cobalt, the high value active anode and cathode materials are removed from the cell to be "refurbished" so that they can be reused in new Li-ion cells. The approach has the advantage of achieving potentially major reductions in the cost of Li-ion cells since the active materials typically are one of the most expensive components of the cells, and of being the most environmentally friendly approach, requiring very little energy use relative to other forms of recycling. Furthermore, the approach has the potential to be self sustaining, as the high value of the re-sold recovered material would fully cover the costs of recycling the material, independent of the metals contained in them and their current market value.

A key step in the process of recycling Li-ion batteries using a direct recycling approach is the separation of the active material. powders (such as $LiCoO_2$ or graphite) from the rest of the cell mass and from each other. The typical process begins with the cell going through a hammer mill in which the entire cell and its components are essentially reduced to a fine powder referred to as the "black mass". Along with the anode and cathode active material, the "black mass" may contain copper powder and aluminum powder from the current collector, steel particles from the cell casing, polymeric binder, polymeric film pieces from the separator, and various forms of high surface area carbon. Much of these components can be removed by sieving the black mass or magnetic adsorption. However, because of the similarity of the cathode active material (metal oxide) and anode active material (graphite) in terms of morphology, it is often very difficult to separate the two from each other. Unfortunately, it is critical that they be separated and purified since any cross contamination can have negative effects on the performance and specifications of the two active materials, Various methods have been used to separate these materials. RSR Technologies has proposed using conventional flotation separation processes, commonly used in the mining industry, to separate the two components. The process typically involves mixing the mixed powder into water. While all of the black mass material will have a tendency to settle to the bottom of the vessel because of the relative densities of the components (ex. ~2.2 g/cc for graphite and ~4.4 g/cc for $LiCoO_2$), in flotation separation the materials are selectively functionalized such that the particle surfaces are either hydrophobic or hydrophilic. Bubbles are created at the bottom of the typically aqueous separation chamber. As the bubbles rise, the hydrophobic material spends more time associated with the rising non-aqueous bubbles, while the hydrophilic material spends more time in the aqueous phase. The result is that the hydrophobic phase is primarily carried to the top of the flotation column and the hydrophilic material drops to the bottom. In the case of separating battery material, the graphite is typically made hydrophobic and will be pushed to the top with the flow of air bubbles, and the metal oxide is hydrophilic and will drop to the bottom, thus separating the two phases.

Unfortunately, the process is complicated by the very small particle size of the materials, which limits the impact of the bulk density, making it more difficult to sink, and because the materials contain a significant amount of polymer binder which makes the chemistry of the surfaces of the materials comprising the black mass behave in a similar manner. As a result, in practice the separation of the battery active materials by this method is typically very poor, with much of the cathode material behaving like the graphite anode material and floating to the top and much of the anode material behaving like the metal oxide cathode materials and sinking to the bottom.

Improvements have been made by trying to remove the binder prior to flotation separation by washing with various solvents at elevated temperature. However, this is difficult to do because of the low solubility of some of the binders and the high surface area of the battery active materials, and to date has not resulted in significant increases in the separation efficiency of these materials. More preferably, the removal of the binder can be easily accomplished later in the process by firing the materials in air once they have been purified. However, firing the black mass to remove the binder prior to separation has a negative impact on the subsequent performance of the active materials. Furthermore, the aqueous method of separation and the surfactants that are used to functionalize the materials can have a negative impact on the performance of the materials once they are recovered. Thus, it is desirable to have a method in which the recovered anode and cathode active materials can be separated prior to removal of the binder and in a medium that is inert to the sometimes highly reactive anode and cathode materials recovered from a Li-ion cell, and with high throughput to limit the time between material separation and regeneration of the materials for reuse in a new cell.

SUMMARY OF THE INVENTION

To address these issues, this invention discloses a new process to more cleanly separate such Li-ion battery materials for subsequent processing and reuse without prior removal of the binder contaminants. The process is ideally suited for separation of typical Li-ion battery anode and cathode materials recovered from used Li-ion cells in a direct recycling process and can be adopted to a continuous process or as a batch process without damaging the materials. According to the present invention, the process for recycling electrode material from lithium ion batteries comprises:

1) harvesting the anode and cathode electrode materials from a lithium-ion battery, in the form of a mixed powder or slurry;
2) separating the electrode powder mixture or slurry into anode and cathode fractions by means of dense liquid separation.

Preferably, the method for separating the electrode powder mixture into anode and cathode fractions by means of dense liquid separation comprises;

a) mixing the harvested electrode active material mixture in a high density liquid whose density lies between those of the anode and cathode powders, respectively;

b) after sufficient time so as to allow the anode, low-density fraction to float to the top of the liquid mixture and the cathode, high-density fraction to sink to the bottom of the liquid mixture, collecting the solid phases of separated fractions;

c) filtering and rinsing the collected solids with appropriate solvent to remove any residual high density liquid, and drying the collected solids.

According to one embodiment of the present invention, the anode material is graphite anode material, the cathode material is lithium metal oxide material, and the high density liquid has a density above 2 g/cc and below 45 g/cc.

According to another embodiment of the present invention, the high density liquid is one or more selected from bromoform, $CHBr_2CH_2Br$, $CH_2BrCBr_3$, $CHBr_2CBr_3$, $CHBr_2CHBr_2$, and all isomers of tribromopropane, tetrabromopropane and pentabromopentane and tribromobenzene, or thallous ethoxide and aqueous thallous formate and thallous malonate.

According to another embodiment of the present invention, the high density liquid is an aqueous or non-aqueous solution containing lithium or sodium based metatungstates, polytungstates, or heteropolytungstates.

According to another embodiment of the present invention, the high density liquid is inert to the recovered battery materials, even when they are in a charged state.

According to another embodiment of the present invention, the mixed powder is mixed with the high density liquid in a mass ratio of 1:5-1:50.

According to another embodiment of the present invention, the mixed powder has a particle size range of 5500 m.

According to another embodiment of the present invention, the process further comprises the step of:

3) purifying and regenerating the anode and cathode powders for reuse in new lithium-ion batteries.

According to another embodiment of the present invention, the separation is accelerated in a centrifuge.

According to another embodiment of the present invention, the method/process is carried out in a continuous process.

According to the present invention, the anode material and cathode material can be well separated without the removal of the binder by the above process. And the thus separated materials can easily be collected and further purified and regenerated for reuse in new lithium-ion batteries by common methods, providing an efficient and low-cost method for recycling electrode active materials from waste lithium-ion batteries. Also, the method can bring high throughput since the separation of the two electrode materials can be highly efficient. Furthermore, the method provided by the present invention can be accomplished without complicated or expensive equipment.

BRIEF DESCRIPTION OF THE DRAWINGS

FIG. 1 shows separation result, wherein (a) showing before being centrifuged, while (b) showing after being centrifuged and forming three distinct layers—the top layer containing mostly anode material, and the bottom layer containing mostly cathode material, with a clear high density liquid layer in-between;

DETAILED DESCRIPTION

Figure 1:
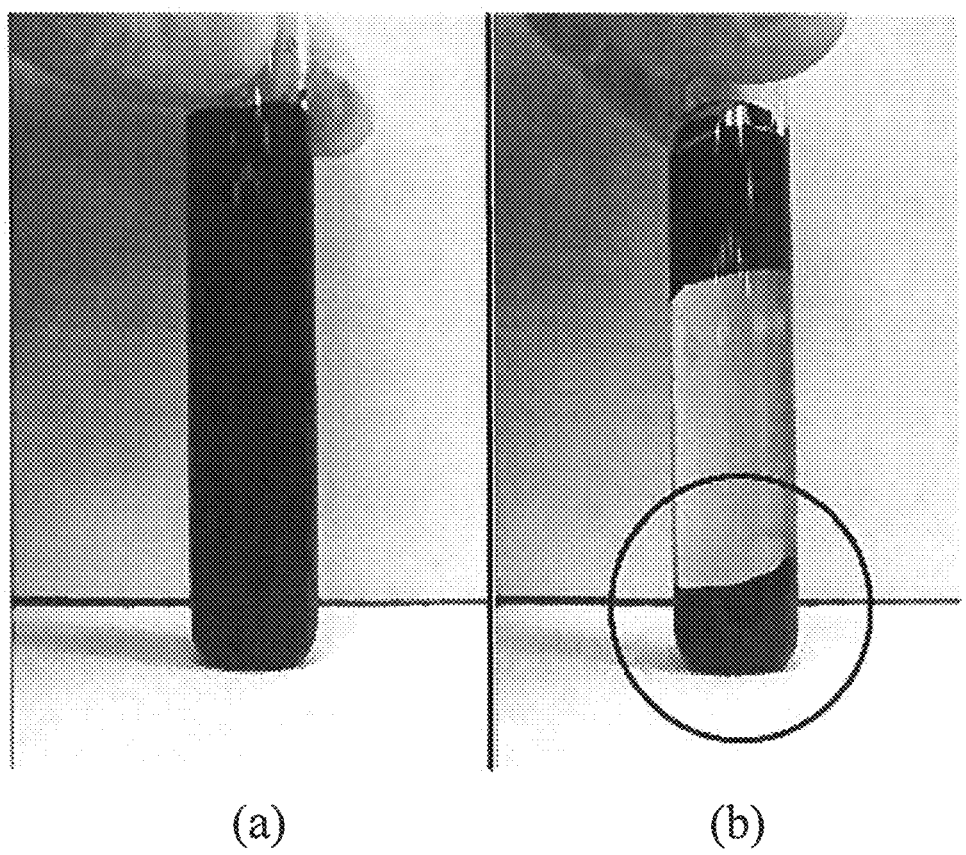

According to the present invention, preferably, the method for separating the electrode powder mixture into anode and cathode fractions by means of dense liquid separation comprises:

a) mixing the harvested electrode active material mixture in a high density liquid whose density lies between those of the anode and cathode powders, respectively;

b) after sufficient time so as to allow the anode material, low-density fraction to float to the top of the liquid mixture and the cathode material, high-density fraction to sink to the bottom of the liquid mixture, collecting the solid phases of the separated fractions;

c) filtering and rinsing the collected solids with appropriate solvent to remove any residual high density liquid, and drying the collected solids.

According to the present invention, the high density liquid can be any liquid as long as 1) the density of the liquid falls into the range of bigger than the density of the anode material and smaller than that of the cathode material, or the density of the liquid may be equal to either the density of the anode material or that of the cathode material; and 2) the liquid does not adversely affect the anode material or the cathode material, such that the liquid is inert to the electrode materials being separated.

According to one embodiment of the present invention, the anode material is graphite anode material, the cathode material is lithium metal oxide material, and the high density liquid has a density above 2 g/cc and below 4.5 g/cc, and more preferable has a density in the range of 2.4-3.2 g/cc.

According to the process provided in the present invention, the suitable liquid can be a liquid of bromo-hydrocarbons in C1-C12 such as bromoform, $CHBr_2CH_2Br$, $CH_2BrCBr_3$, $CHBr_2CHBr_2$, and all isomers of tribromopropane, tetrabromopropane and pentabromopentane and tribromobenzene, or alkoxides or carboxylates of thallium. According to one embodiment of the present invention, the suitable liquid can be selected from one or more of bromoform, $CHBr_2CH_2Br$, $CH_2BrCBr_3$, $CHBr_2CBr_3$, $CHBr_2CHBr_2$, and all isomers of tribromopropane, tetrabromopropane and pentabromopentane and tribromobenzene, or thallous ethoxide and aqueous thallous formate and thallous malonate, preferably bromoform. For the isomers, two or more bromine atoms can be located on the same or different carbon atom; the carbon train can be linear or branched. Said tetrabromopropane includes but is not limited to 1,2,2,3-tetrabromopropane. Said tribromopropane includes but is not limited to 1,2,3-tribromopropane. Said tribromobenzene includes but is not limited to 1,3,5-tribromobenzene. According to another embodiment of the present invention, the high density liquid is an aqueous or non-aqueous solution containing lithium or sodium based metatungstates, polytungstates, or heteropolytungstates, since such high density liquid has the advantage of being non-toxic and not harmful to the environment. The concentration of the solution may be in the range of 10-90 wt % dissolved solids, as long as the density of the solution falls into the range bigger than the density of the anode material and smaller than that of the cathode material, or the density of the solution is equal to either the density of the anode material or that of the cathode material.

According to another embodiment of the present invention, the high density liquid is inert to the recovered battery materials, even when they are in a charged state, such that exposure to the high density liquid throughout the separation process does not adversely affect the properties of the anode material or cathode material.

According to another embodiment of the present invention, the mixed powder or slurry is mixed with the high density liquid in a mass ratio of 1:5-1:50, preferably in a mass ratio of 1:10-1:30, more preferably in a mass ratio of 1:10-1:20. For slurry, the mass ratio is calculated in the dried weight.

According to another embodiment of the present invention, the mixed powder has a particle size range of 5-500 µm, preferably 5-50 µm. The mixed powder can be obtained by referring to the prior art, such as by shredding the Li-ion battery in a hammer mill. According to the present invention, the mixing and separation can be carried out either at room temperature or elevated temperature, such as in the temperature range of 25-80° C., either in a vessel or other container, as long as a slurry can be formed.

According to the present invention, the slurry mixture can be allowed to sit as the high density solid phase separates to the bottom of the vessel or other container and the low density solid phase separates to the top of the vessel or other container, with optionally further the liquid phase (middle density) in the middle. Preferably, the separation is accelerated by use of a centrifuge. That is, the separation is preferably carried out by aid of centrifugal force, and the vessel or other container containing the slurry of black mass in the high density liquid is placed into a centrifuge, the centrifuge is run for a period of time sufficient to drive the anode and cathode materials to opposite ends of the vessel or other container, the vessel or other container is removed from the centrifuge and the solids are collected. Using a centrifuge has the further advantage of compacting the solids for easy collection and processing. According to another embodiment of the present invention, the process/method may be carried out in a continuous process or a batch process. For the continuous process, the slurry is continuously introduced into the vessel or other container and separated with or without the use of centrifugal force and the separated materials are continually collected from either end of the vessel or other container.

After the high density and low density layers have formed, the solids from each layer may be filtered and rinsed with an appropriate solvent such as acetone and/or deionized water to remove any residual high density liquid, and then preferably the solids may be dried to remove any residual solvent.

According to the present invention, preferably, the process further comprises the step of 3) purifying and regenerating the anode and cathode materials for reuse in new lithium-ion batteries.

The purifying method can be any one suitable for further separating the anode materials and the cathode materials from each other and further removing other impurities, which will be known to those skilled in the art. For example, the high density or low density solid fractions may be collected and subject to another iteration of high density liquid separation to improve the separation yield. The purifying method for the cathode material may involve treatment in basic or dilute acidic solution to remove copper and aluminum contaminants, and heat treatment in a furnace to decompose residual binder and anode material that may be present. And the purifying method for the anode material may be treatment in hydrochloric acid solution to dissolve any contaminant cathode particles that may be present.

The regenerating method can be any one suitable for regenerating the anode materials and the cathode materials to the extent of being able to reuse the materials in new Li-ion batteries, which will be known to those skilled in the art. For example, the regenerating method for the cathode material may involve mixing the material with a quantity of LiOH or $Li_2CO_3$ followed by heat treatment at elevated temperature to replenish the original stoichiometric lithium content of the cathode material. And the regenerating method for the anode material may involve heat treatment to decompose residual binder components and clean the surface of the anode material. For the present invention, the anode material can be any or all of the known anode materials that can be used as the anode active materials of Li-ion batteries, such as one or more of graphite, silicon, silicon monoxide, and graphite/Si or graphite/SiO composites, and so on.

For the present invention, the cathode material can be any or all of the known cathode materials that can be used as the cathode active materials of Li-ion batteries, such as one or more of $LiCoO_2$, $LiNiCoO_2$, $LiNiCoMnO_2$, $LiMn_2O_4$, $LiNiCoAlO_2$, and $LiFePO_4$ and so on.

The features and advantage will be further illustrated by the following examples, which are presented only to further disclose the invention, without limiting the present invention in any way.

EXAMPLES

Example 1

1) selecting bromoform as the high density liquid;
2) providing a powder mixture of $LiCoO_2$ cathode material and a graphitic anode material, each with some PVDF contaminant, from a Li-ion battery, and the particle size range of the mixture is 5-50 µm;
3) mixing the powder mixture with the high density liquid in a mass ratio of 1:10 in a vessel to create a slurry;
4) placing the vessel into a centrifuge and running the centrifuge to allow the slurry to separate to three layers according to density difference, please see FIG. (b),—with the top layer containing mostly anode material, the bottom layer (the circled layer) containing mostly cathode material, with a clear bromoform layer in-between, which is greatly different than (a) showing the slurry before being centrifuged;
5) collecting the solid phases in different layers by filtration and rinsing with acetone, and then drying them.

Figure 2:
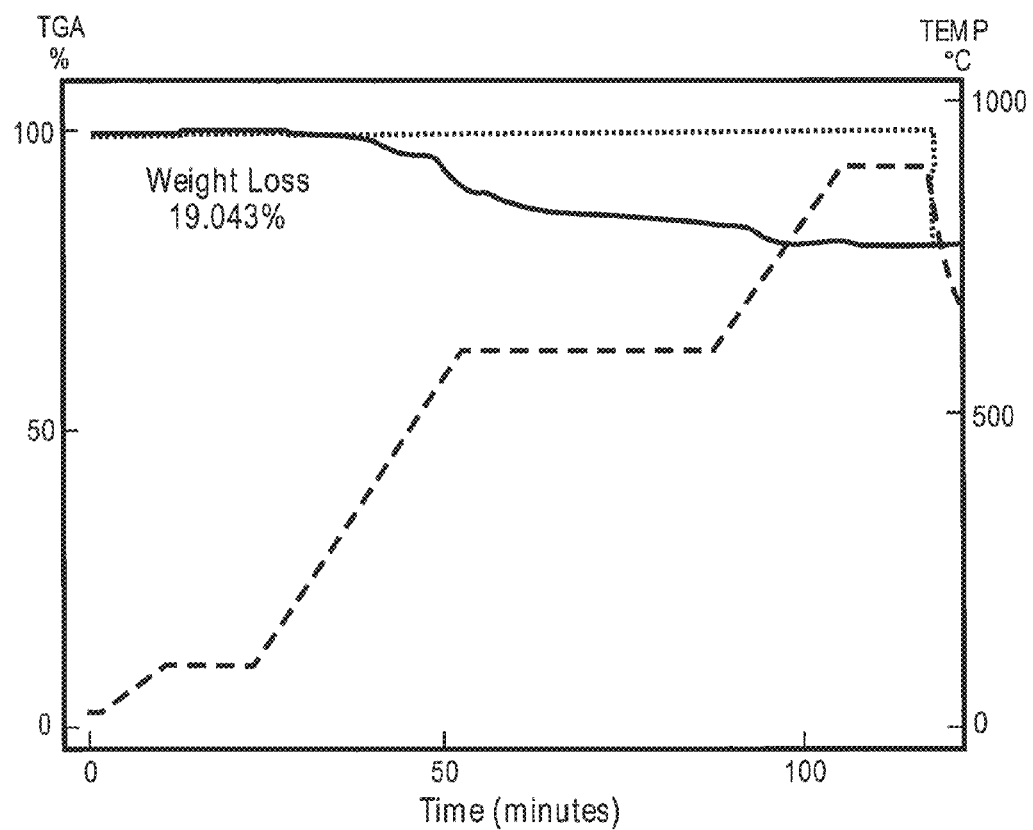
FIG. 2 is the TGA plot of the bottom layer shown in FIG. 1, showing that heating to above the thermal decomposition temperature of the anode and PVDF binder results in a 19% weight loss.

TGA analysis of the bottom layer (as shown in FIG. 2), containing predominantly cathode material, shows a weight loss of 19% upon heating to above the thermal decomposition temperature of the anode material and PVDF and conductive carbon, corresponding to a 91% metal oxide phase composition in the bottom layer based on the amount of the solid of the bottom layer (note the cathode material and anode material each contain ~10 wt % conductive carbon and PVDF).

Figure 3:
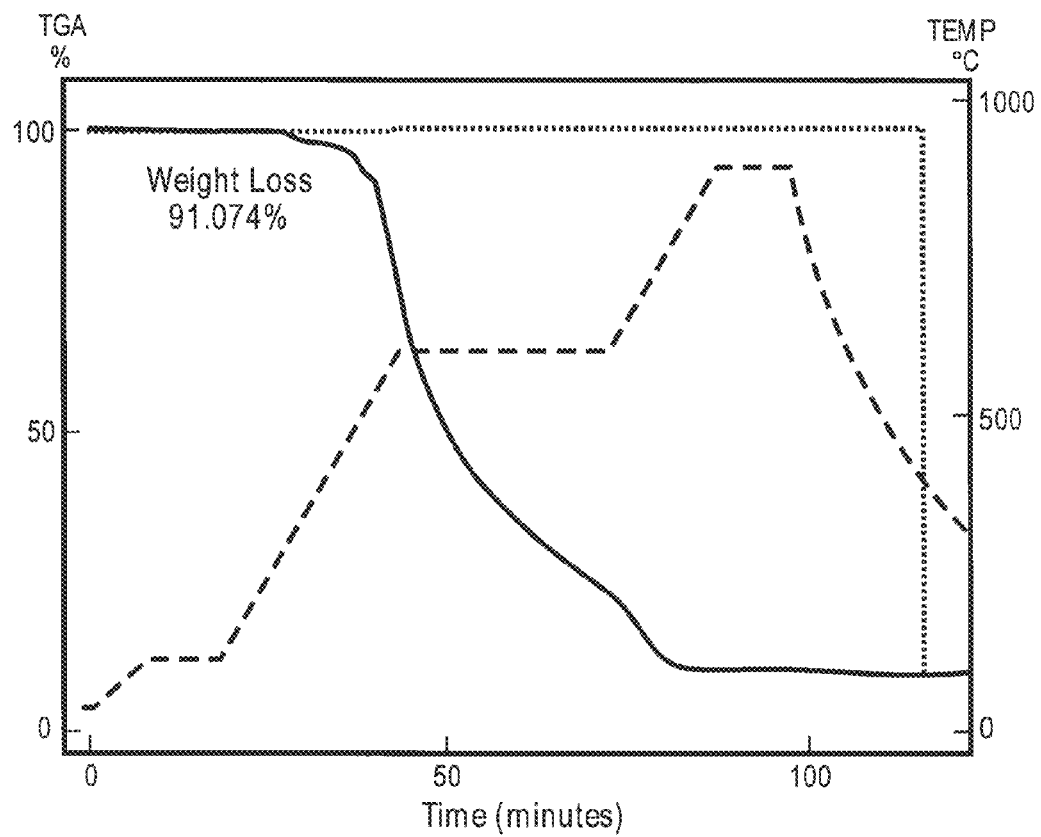
FIG. 3 is the TGA plot of the top layer shown in FIG. 1, showing that heating to above the thermal decomposition temperature of the anode and PVDF binder results in a 91% weight loss.

TGA analysis of the top layer (as shown in FIG. 3), containing predominantly anode material, shows a weight loss of 91% upon heating to above the thermal decomposition temperature of the anode material and PVDF and conductive carbon, corresponding to a 90% anode phase composition in the top layer based on the amount of the solid of the top layer.

6) heating the material from the bottom layer fraction in a furnace to purify the cathode material by decomposing any residual PVDF, conductive carbon, or anode material present.

7) reacting the material from the top layer fraction in an acid solution to purify the anode material by dissolving any residual cathode material present.

8) mixing the cathode material with LiOH and reacting the mixture in a furnace to regenerate the cathode material.

9) heating the anode material in a furnace to regenerate the anode material, 10) forming new electrodes from the anode material and cathode material, respectively, and testing the electrochemical performance in coin cells to demonstrate the above regenerated cathode and anode material can be reused in a new Li-ion battery.

Example 2

1) selecting aqueous lithium metatungstate (in a concentration of ~75 wt %, and with a density of ~2.6 g/cc) as the high density liquid;

2) providing a powder mixture of $LiNiCoMnO_2$ cathode material and a graphitic anode material, each with some PVDF contaminant, from a Li-ion battery, and the particle size range of the mixture is 5-100 µm;

3) mixing the powder mixture with the high density liquid in a ratio of 1:15 in a vessel to create a slurry;

4) allowing the vessel to sit undisturbed, and the slurry to separate into three layers according to density difference—the top layer containing mostly anode material, and the bottom layer containing mostly cathode material, with a clear aqueous lithium metatungstate layer in-between;

5) collecting the solid phases in different layers by filtration and rinsing with de-ionized water, and then drying them.

TGA analysis (without showing the figure) of the bottom layer, containing predominantly cathode material, shows a weight loss of 19% upon heating to above the thermal decomposition temperature of the anode material and PVDF and cathode material, corresponding to a 91% metal oxide phase composition in the bottom layer based on the amount of the solid of the bottom layer (note the cathode material and anode material each contain ~10 wt % conductive carbon and PVDF).

TGA analysis (without showing the figure) of the top layer, containing predominantly anode material, shows a weight loss of 91% upon heating to above the thermal decomposition temperature of the anode material and PVDF and cathode material, corresponding to a 90% anode phase composition in the top layer based on the amount of the solid of the top layer.

6) heating the material from the bottom layer fraction in a furnace to purify the cathode material by decomposing any residual PVDF, conductive carbon, or anode material present.

7) reacting the material from the top layer fraction in an acid solution to purify the anode material by dissolving any residual cathode material present.

8) mixing the cathode material with $LiC_2O_3$ and reacting the mixture in a furnace to regenerate the cathode material.

9) heating the anode material in a furnace to regenerate the anode material.

10) forming new electrodes from the anode material and cathode material, respectively, and testing the electrochemical performance in coin cells to demonstrate the above regenerated cathode and anode material can be reused in a new Li-ion battery.

Comparative Example 1

According to the procedure in Example 2 to separate the anode material and the cathode material, except that the aqueous lithium metatungstate is replaced with pure water. As a result, the top layer contained only 10% of the anode material based on the amount of the anode material, while the bottom layer contained 99% of the cathode material based on the amount of the cathode material and 90% of the anode material based on the amount of the anode material. That is, the anode material and cathode material have not been well separated.

As can be seen from the above examples, the anode material and cathode material can be well separated without the removal of the binder by the process provided by the present invention, for which complicated equipment is not necessary.

What is claimed is:

1. A process for recycling electrode material from lithium-ion batteries, comprising:
   1) harvesting the anode and cathode electrode materials from lithium-ion batteries, in the form of a mixed powder or slurry;
   2) separating the mixed powder or slurry into anode and cathode fractions by means of dense liquid separation, comprising:
      a) mixing the mixed powder or slurry in a high density liquid which has a density above 2 g/cc and below 4.5 g/cc, and whose density lies between those of the anode and cathode material, respectively;
      b) after sufficient time so as to allow the anode material, low-density fraction to float to the top of the liquid mixture and the cathode material, high-density fraction to sink to the bottom of the liquid mixture, collecting the solid phases of the separated fractions; and
      c) filtering and rinsing the collected solids with appropriate solvent to remove any residual high density liquid, and drying the collected solids.

2. The process according to claim 1, wherein the anode material is graphite anode material, the cathode material is lithium metal oxide material.

3. The process according to claim 2, wherein the high density liquid is selected from one or more of bromoform, $CHBr_2CH_2Br$, $CH_2BrCBr_3$, $CHBr_2CBr_3$, $CHBr_2CHBr_2$, and all isomers of tribromopropane, tetrabromopropane and pentabromopentane and tribromobenzene, or thallous ethoxide, and aqueous thallous formate and thallous malonate.

4. The process according to claim 1, wherein the high density liquid is selected from one or more of bromoform, $CHBr_2CH_2Br$, $CH_2BrCBr_3$, $CHBr_2CBr_3$, $CHBr_2CHBr_2$, and all isomers of tribromopropane, tetrabromopropane and pentabromopentane and tribromobenzene, or thallous ethoxide, and aqueous thallous formate and thallous malonate.

5. The process according to claim 1, wherein the high density liquid phase is an aqueous or non-aqueous solution containing lithium or sodium based metatungstates, polytungstates, or heteropolytungstates.

6. The process according to claim 1, wherein the high density liquid is inert to the recovered battery materials, even when they are in a charged state.

7. The process according to claim 1, wherein the mixed powder is mixed with the high density liquid in a mass ratio of 1:10-1:20.

8. The process according to claim 1, wherein the mixed powder has a particle size of 5-500 μm.

9. The process according to claim 1, further comprising
    3) purifying and regenerating the anode and cathode fractions for reuse in new lithium-ion batteries.

10. The process according to claim 1, wherein the separation is centrifugal separation.

11. The process according to claim 1, which is carried out as a continuous process.

12. The process according to claim 1, wherein the mixed powder is mixed with the high density liquid in a mass ratio of 1:5-1:50.

13. The process according to claim 1, wherein the mixed powder is mixed with the high density liquid in a mass ratio of 1:10-1:30.

14. The process according to claim 2, wherein the mixed powder is mixed with the high density liquid in a mass ratio of 1:5-1:50.

15. The process according to claim 2, wherein the mixed powder is mixed with the high density liquid in a mass ratio of 1:10-1:30.

16. The process according to claim 2, wherein the mixed powder is mixed with the high density liquid in a mass ratio of 1:10-1:20.

17. The process according to claim 3, wherein the mixed powder is mixed with the high density liquid in a mass ratio of 1:5-1:50.

18. The process according to claim 3, wherein the mixed powder is mixed with the high density liquid in a mass ratio of 1:10-1:30.

19. The process according to claim 3, wherein the mixed powder is mixed with the high density liquid in a mass ratio of 1:10-1:20.

* * * * *